(12) United States Patent
Haley, III

(10) Patent No.: US 6,939,462 B2
(45) Date of Patent: Sep. 6, 2005

(54) WASTEWATER TRICKLE TOWER BIOMEDIA WITH CASING

(75) Inventor: John W. Haley, III, Providence, RI (US)

(73) Assignee: Bioprocess Technologies, Ltd., Portsmouth, RI (US)

( * ) Notice: Subject to any disclaimer, the term of this patent is extended or adjusted under 35 U.S.C. 154(b) by 37 days.

(21) Appl. No.: 10/375,387

(22) Filed: Feb. 27, 2003

(65) Prior Publication Data

US 2004/0168961 A1 Sep. 2, 2004

(51) Int. Cl.⁷ .................................................. C02F 3/04
(52) U.S. Cl. ...................... 210/150; 210/232; 210/615
(58) Field of Search .............................. 210/150, 151, 210/615, 232

(56) References Cited

U.S. PATENT DOCUMENTS

| | | | |
|---|---|---|---|
| 2,008,507 A | | 7/1935 | Laughlin |
| 2,308,866 A | | 1/1943 | Dekema |
| 3,231,490 A | * | 1/1966 | Fry .............................. 210/150 |
| 3,238,124 A | | 3/1966 | Burton |
| 3,275,147 A | | 9/1966 | Gilde |
| 3,835,039 A | * | 9/1974 | Ciambrone ................. 210/615 |
| 4,088,571 A | * | 5/1978 | Helgesson .................. 210/150 |
| 4,411,780 A | * | 10/1983 | Suzuki et al. ............... 210/150 |
| 4,422,930 A | | 12/1983 | Hatanaka |
| 4,451,362 A | | 5/1984 | Spelsberg |
| 4,717,519 A | | 1/1988 | Sagami |
| 4,729,828 A | | 3/1988 | Miller |
| 4,895,645 A | * | 1/1990 | Zorich, Jr. ................... 210/150 |
| 4,929,484 A | * | 5/1990 | Basse ......................... 210/150 |
| 5,085,766 A | | 2/1992 | Born |
| 5,389,248 A | * | 2/1995 | Pare et al. ................... 210/151 |
| 5,397,474 A | | 3/1995 | Henry |
| 5,399,266 A | * | 3/1995 | Hasegawa et al. .......... 210/150 |
| 5,622,630 A | | 4/1997 | Romano |
| 5,976,377 A | | 11/1999 | Hyfantis, Jr. et al. |
| 6,238,563 B1 | * | 5/2001 | Carroll, II et al. .......... 210/151 |
| 6,241,889 B1 | | 6/2001 | Haley, III |
| 6,274,035 B1 | * | 8/2001 | Yuan et al. .................. 210/150 |
| 6,319,407 B1 | * | 11/2001 | Maatta et al. ............... 210/150 |

OTHER PUBLICATIONS

Steele and McGhee, "Water Supply and Sewerage," 1979, p. 492.*

* cited by examiner

Primary Examiner—Christopher Upton
(74) Attorney, Agent, or Firm—Jonathan A. Harris; Wildman, Harrold, Allen & Dixon LLP

(57) ABSTRACT

A wastewater trickle tower has at least one biomedia grate including pairs of upper hanger bars, pairs of lower hanger bars, and spaced-apart rows of biomedia strands, preferably looped cord strands, connecting the upper and lower hanger bars. Upper ends of the strands are secured between pairs of the upper hanger bars, and lower ends of the strands are secured between pairs of the lower hanger bars. A base receptacle to collect wastewater is disposed below the grate. The upper hanger bars are secured together as a unit, the lower hanger bars are secured together as a unit, and a tensioning arrangement is provide for tensioning the strands by influencing the upper and lower hanger bars apart. The grate may be mounted in and surrounded by a rigid casing so forming a self-supporting filter unit. Two or more such casings may be stackable one upon the other to form a trickle tower two of more filter units high.

10 Claims, 13 Drawing Sheets

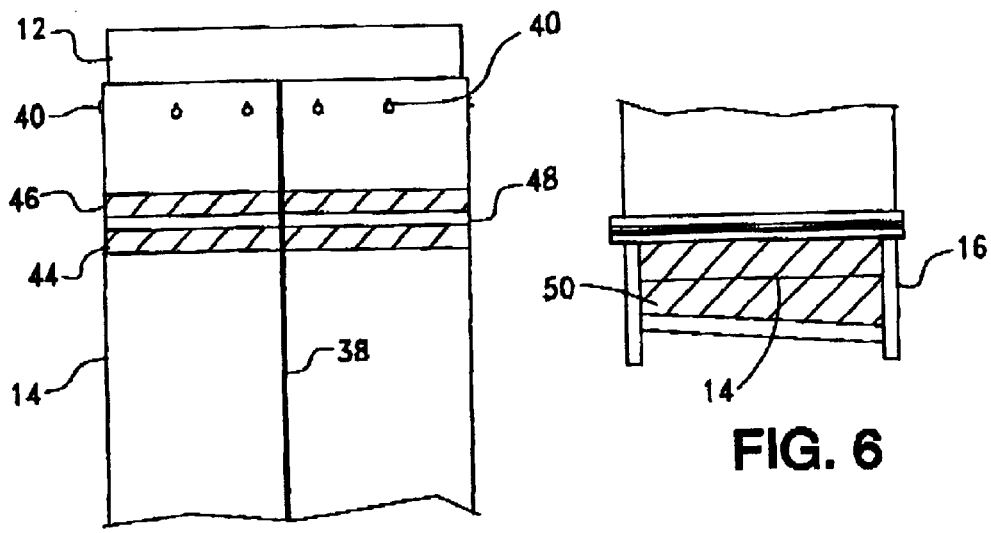
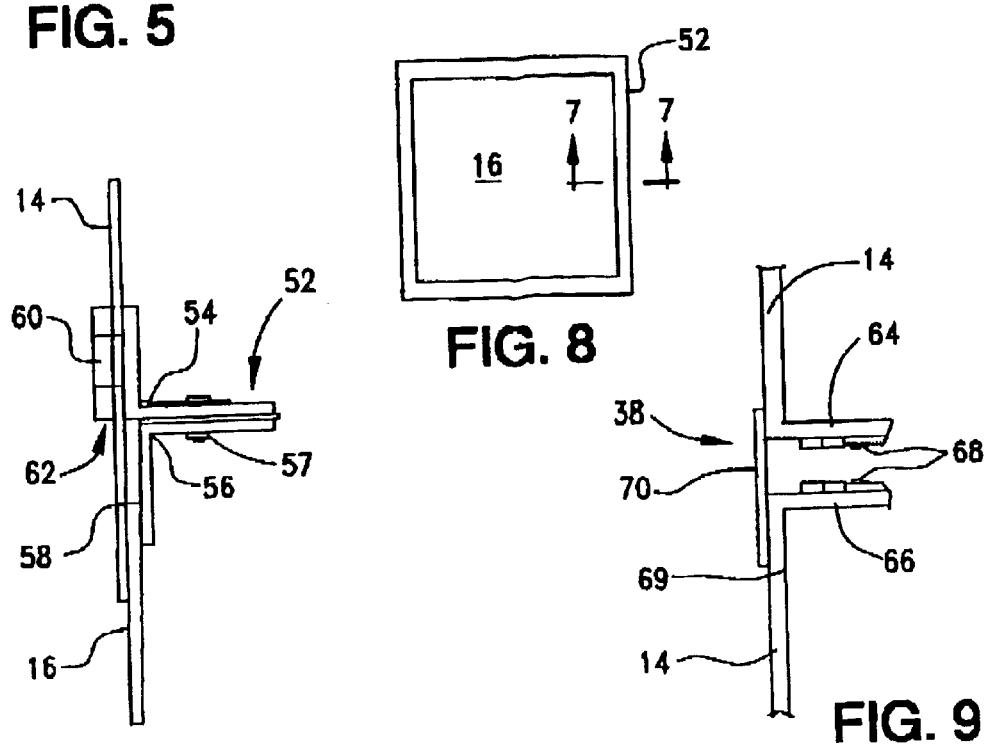

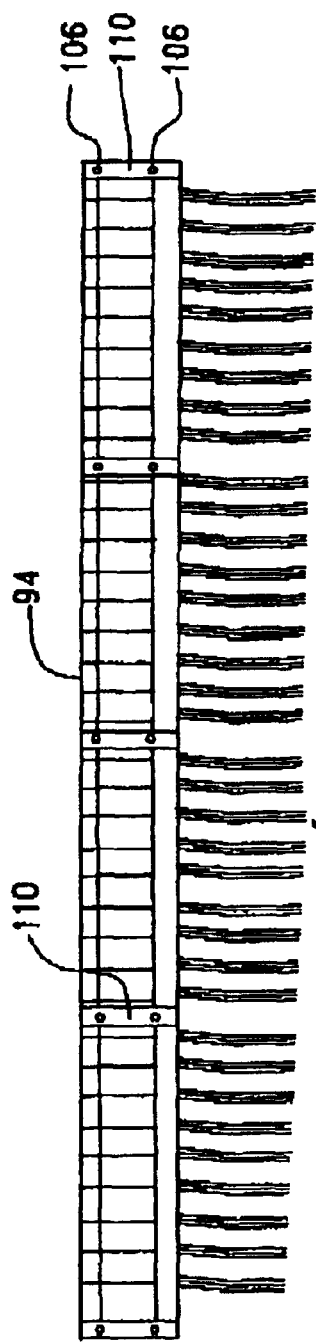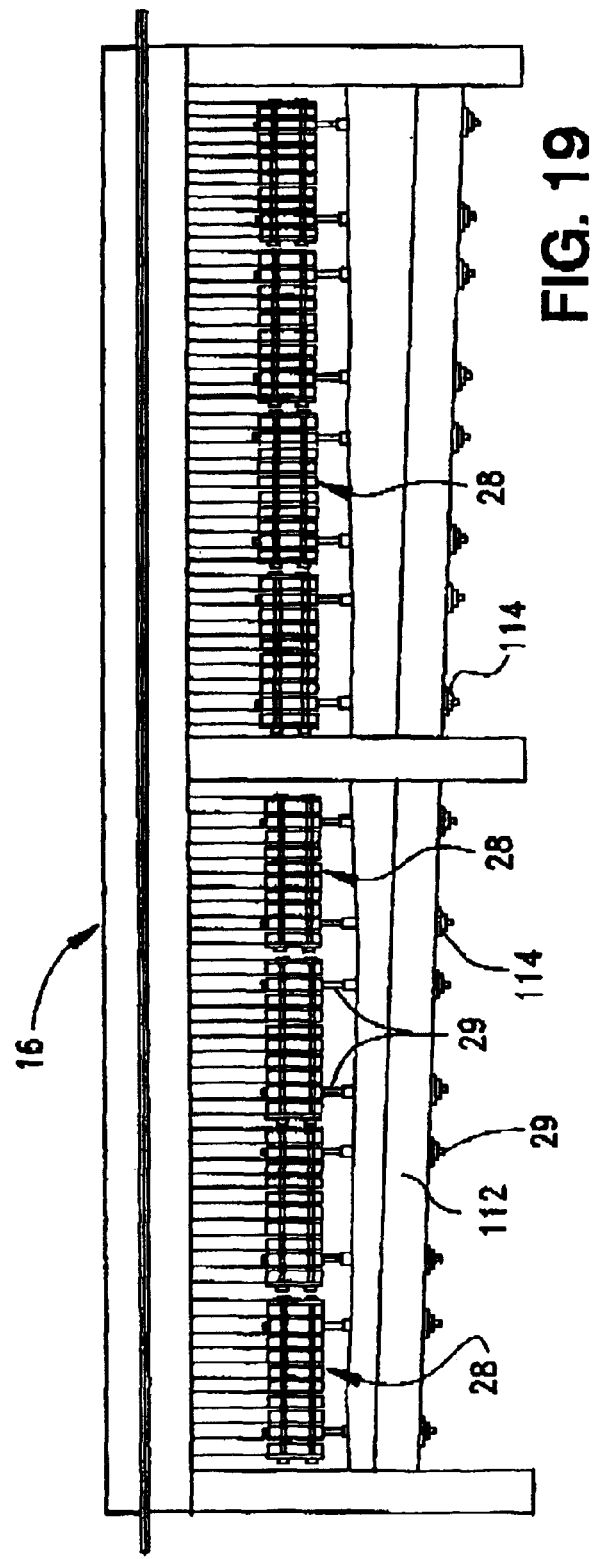

WASTEWATER TRICKLE TOWER BIOMEDIA WITH CASING

FIELD OF THE INVENTION

This invention relates to the treatment of wastewater using one or more trickle towers employing biomedia. This invention particularly relates to the arrangement of strands of biomedia and the construction of biomedia filters formed thereby.

BACKGROUND OF THE INVENTION

With greater demands being placed on the treatment of wastewater by regulatory authorities, there has become a growing need for systems that will treat wastewater to a higher level of purity. This has also brought an increasing need for systems that are more versatile in design and can more readily be adapted to handle differing wastewater treatment requirements.

I have found that a trickle tower system employing strands of looped cord biomedia is more suited to handling today's increasing demands in wastewater treatment than the conventional systems currently in use. The initial approach of a looped cord biomedia trickle tower system is disclosed in my U.S. Pat. No. 6,241,889 published Jun. 5, 2001. While this tower system has been promising, and the general approach employed appears correct, further improvements and modifications are now desirable for more widespread adoption by industry and civil authorities.

SUMMARY OF THE INVENTION

This invention is concerned with improving and modifying the wastewater treatment process and apparatus disclosed in the above U.S. Pat. No. 6,241,889 the whole disclosure of which is hereby incorporated herein by reference.

This invention is also concerned with developing further approaches to trickle tower treating of wastewater. Some of these approaches are particularly advantageous with looped cord biomedia, and others are advantageous with other biomedia and other systems in addition to being applicable with looped cord biomedia.

This invention is particularly concerned with the mounting of strands of biomedia in a unit, and the incorporation of this unit, as a biomedia filter, into a wastewater trickle tower.

The invention is also concerned with improving the ease, flexibility, and cost of constructing wastewater trickle towers. At the same time, the invention is concerned with improving the efficiency and effectiveness of these trickle towers.

According to one aspect of the present invention, a wastewater treatment apparatus comprises a support structure having a base, a trickle tower supported by the support structure and containing biomedia, the biomedia being in the form of at least one grate having a plurality of hanger frames, each hanger frame containing a row of vertically extending strands. Each hanger frame has a pair of mutually connected upper hanger bars and a pair of mutually connected lower hanger bars, upper ends of the strands of a respective row being clamped between the upper bars and lower ends of these strands being clamped between the lower bars. The pairs of upper bars of the grate are connected together, the pairs of lower bars of the grate are connected together, the upper bars are suspended from the supporting structure, and the lower bars are anchored therebelow with the rows of strands being tensioned between the upper and lower bars.

The strands are preferably each formed as an individual discrete length, and may be formed as cut lengths.

Preferably, the strands are individual lengths of looped cord biomedia. The looped cord may be formed with at least some of the loops orientated or having a bias in one direction along the looped cord, and the strands themselves are then orientated with these orientated loops all orientated in the same direction, which may be upwardly opposite to the fall of wastewater down the trickle tower.

The grates may be anchored, and at the same time the strands adjustably tensioned, by adjusting bolts.

Spacing elements are preferably disposed between adjacent pairs of bars, and bolts employed to clamp the pairs of bars and the spacing elements together. At least one bolt may clamp all the pairs of upper bars together, and at least one bolt clamp all the pairs of lower bars together.

The upper pairs of bars are preferably rigidly connected together as a rigid unit. Similarly, the lower pairs of bars are preferably rigidly connected together as a rigid unit.

A sleeve may surround the grate, the sleeve having a rectangular horizontal cross-section and comprising flexible sheeting suspended from the support structure. Alternatively, or in addition, the grate may be surrounded by and supported by a structural casing, which may be free standing and comprise the support structure, the casing and the grate forming a filter unit.

According to a further aspect of the present invention, there is provided a biomedia filter unit for incorporation in a trickle tower wastewater treatment apparatus, the filter unit comprising a grate having a plurality of hanger frames, each hanger frame having a row of individual, spaced-apart biomedia strands. Each hanger frame comprises a pair of mutually connected upper hanger bars and a pair of mutually connected lower hanger bars, upper ends of the strands of a respective row being clamped between the upper bars, and lower ends of these strands being clamped between the lower bars. The pairs of upper bars of the grate are spaced apart and connected together, and the pairs of lower bars of the grate are also spaced apart and connected together.

The strands may comprise discrete lengths of looped cord whereby each strand is physically separate from the next strand. These discrete lengths may be cut lengths, for example, cut from a continuous warp. The cord preferably has at least some of its loops orientated in one direction, allowing all the lengths of cord to be disposed with all the so orientated loops orientated in the same direction.

The bars may be made of plastic material and glued together.

Each strand may have free ends protruding from the respective pairs of bars between which the ends are clamped. This occurs when a warp of the strands is laid out, then at least one of the pairs of bars clamped across the warp, followed by cutting the warp adjacent the bars. These ends may be heat treated to form enlarged melted ends drawn against the adjacent pair of hanger bars.

For transportation and storage, a collapsible version of the filter may conveniently be packaged in a box, one set of bars being disposed in the bottom of the box, and the other set of bars being disposed at the top of the box with the biomedia strands being collapsed and disposed between the two sets of bars.

Apart from this filter being readily transportable as a collapsed unit, it is also convenient to mount in a trickle tower, and can function with good efficiency in treating wastewater.

Instead of being a collapsible unit, the filter unit may have an outer structurally self-supporting casing with the upper hanger bars supported inside the casing, and the lower hanger bars held downwardly inside the casing. The casing preferably includes members that cooperate with the upper and lower hanger bars for enabling tensioning of the biomedia strands between the upper and lower hanger bars, the tensioning being effected by influencing the upper and lower hanger bars apart.

According to yet another aspect of the present invention, there is provided a wastewater trickle tower apparatus having at least one biomedia grate comprising upper hanger bars, lower hanger bars, and spaced-apart rows of looped cord biomedia strands connecting the upper and lower hanger bars. Upper ends of the strands are secured by the upper hanger bars, and lower ends of the strands are secured by the lower hanger bars. A base receptacle is disposed below the grate. The upper hanger bars are secured together as a unit, the lower hanger bars are secured together as a unit, and tensioning means is provided for tensioning the strands by influencing the upper and lower hanger bar units apart.

The grate may be mounted in and surrounded by a rigid casing so forming a self-supporting filter unit. Two or more such rigid casings may be stackable one upon the other to form a trickle tower two or more filter units high. A wastewater discharge unit may be stacked on and supported by the casing of the, or the upper, filter unit.

Other objects, features, and advantages of the present invention will become more fully apparent from the following detailed description of the preferred embodiments, the appended claims, and the accompanying drawings.

BRIEF DESCRIPTION OF THE DRAWINGS

In the accompanying drawings, in which like reference characters in the same or different Figures indicate like parts:

FIG. 5 is a partial schematic elevational view in the direction of the arrow 5 in FIG. 4;

FIG. 6 is a partial schematic elevational view of the lower section of a cell of the apparatus of FIG. 1 showing the lower part of the curtain inside a base receptacle;

FIG. 7 is a section on the line 7—7 of FIG. 8 showing details of sealing the curtain to the inside of the base receptacle;

FIG. 8 is a simplified plan view of the base container of FIGS. 6 and 7;

FIG. 9 is a diagrammatic plan view of an openable vertical connection in the curtain of FIGS. 3 and 5;

FIG. 18 is a side view of a modification of the grate of FIG. 15 showing the upper portions of the biomedia strands extending downwardly from the upper structure of the grate;

FIG. 19 is a simplified elevational view of a base receptacle for the apparatus of FIG. 1 showing the lower portions of eight biomedia grates anchored to the bottom of the receptacle;

DETAILED DESCRIPTION OF THE PREFERRED EMBODIMENTS

Figure 1:
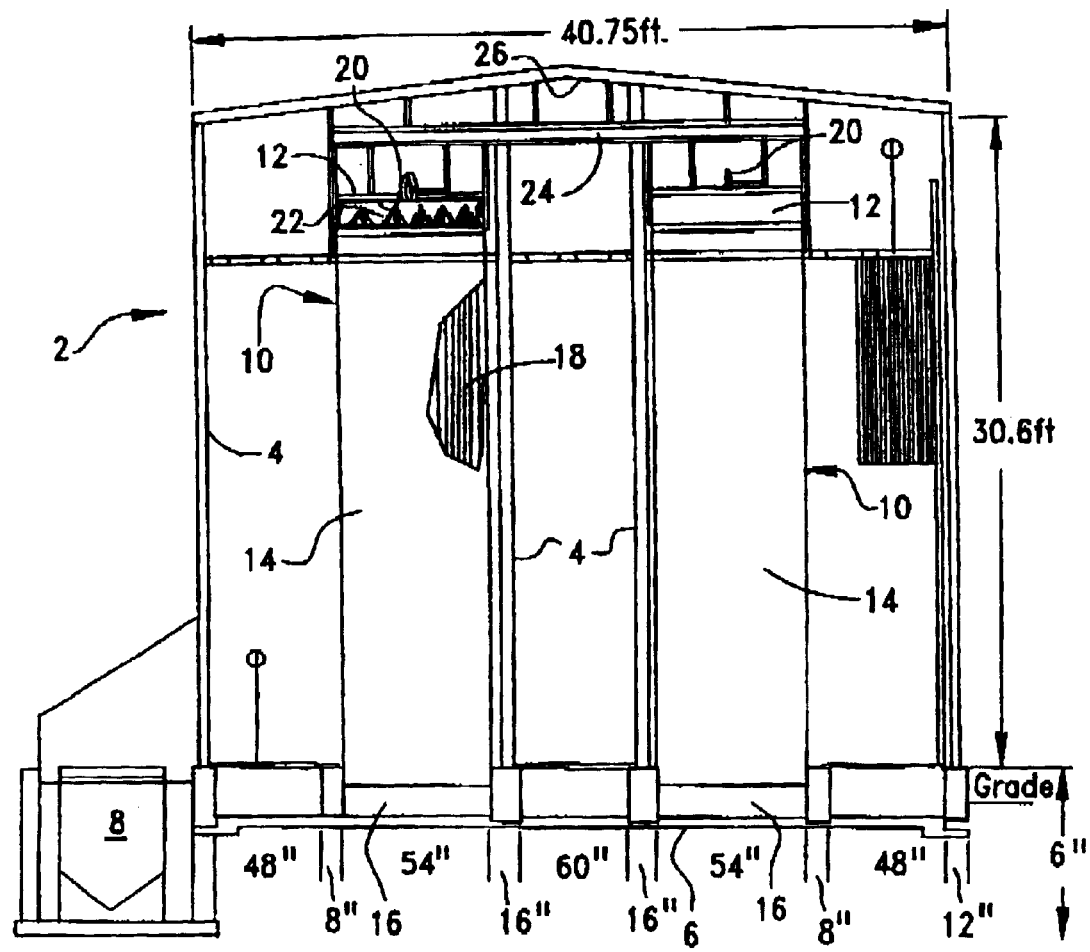
FIG. 1 is a schematic vertical section of a trickle tower wastewater treatment apparatus embodying the present invention.

FIG. 1 shows an exterior, weatherproof, steel building 2 having a support structure 4 erected on a concrete base 6, with a covered recirculation tank 8 outside the building. Two wastewater treatment cells 10 are shown. Each cell 10 has an upper closure hood 12, a flexible curtain 14 draped around the hood 12 and extending downwardly into a base receptacle 16 formed on the concrete base 6. Biomedia 18 is enclosed by the curtain 14, and a wastewater spraying or discharge system 20 is mounted inside the hood 12 above the biomedia, both as shown through broken away portions of the left cell 10. Wastewater 22 from the spraying system 20 flows down the biomedia 18 and drips into the base receptacle 16, illustrated as a base tray from which the partially treated wastewater flows to the recirculation tank 8 for recirculation to the spraying system 20 of the same or another cell. Of course, the base tray 16 could be constructed as a recirculation tank, so eliminating the outside recirculation tank 8. The hoods 12 are suspended by structural members 24, 26 supported by and forming part of the building structure 4, for example the roof rafters. The curtains 14 are attached and sealed to the outside of the hoods 12, and to the inside of the base receptacles 16.

Figure 2:
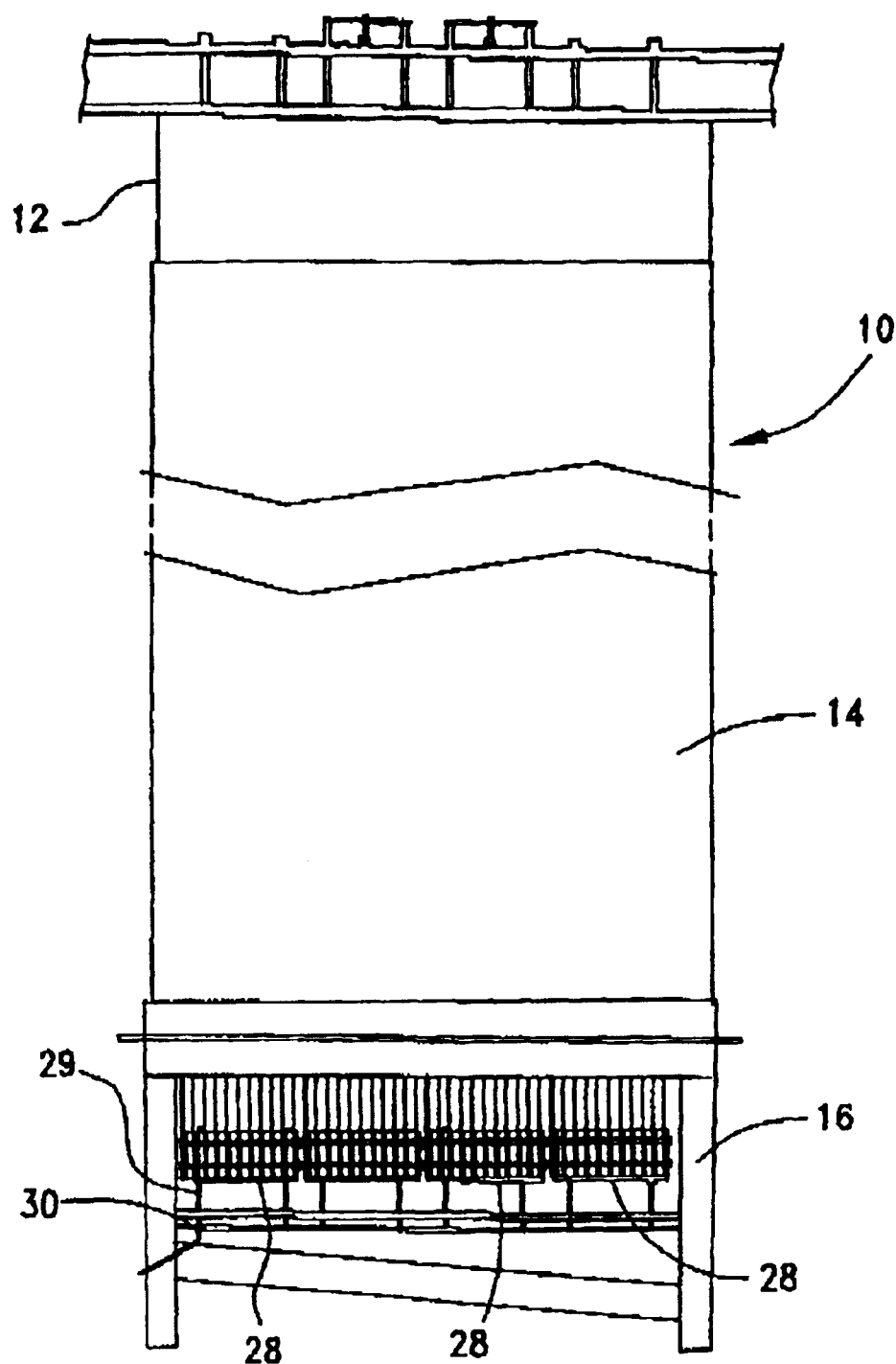
FIG. 2 is an elevational side view, with parts removed for clarity, of a single cell unit of the apparatus of FIG. 1.

FIG. 2 shows one of the cells 10 in side view, the curtain 14 surrounding and defining this cell, extending downwards from the outside of the hood 12 to the inside of the base receptacle 16. Although varies types of biomedia could be used inside the confines of the curtains 14, looped cord biomedia having looped continuous filaments is preferred, and preferably the looped cord biomedia is tensioned vertically. To show such a preferred arrangement, the side of the base receptacle 16 has been omitted to expose lower ends of four biomedia grates 28 (described in detail late) attached by adjustable tensioning bolts 29 to an anchor bar 30 extending horizontally across the base receptacle 16. These tensioning bolts 29 are a slip fit through holes in the anchor bar 30, to allow the bolts 29 to slip downwardly through the anchor bar 30, should any biomedia grate 28 lengthen and drop down a little in use due to the weight of the biomass forming on the biomedia strands of the grate. This prevents such strands from sagging in use, and further mitigates the possibility of biomass bridging between adjacent biomedia strands.

Figure 3:
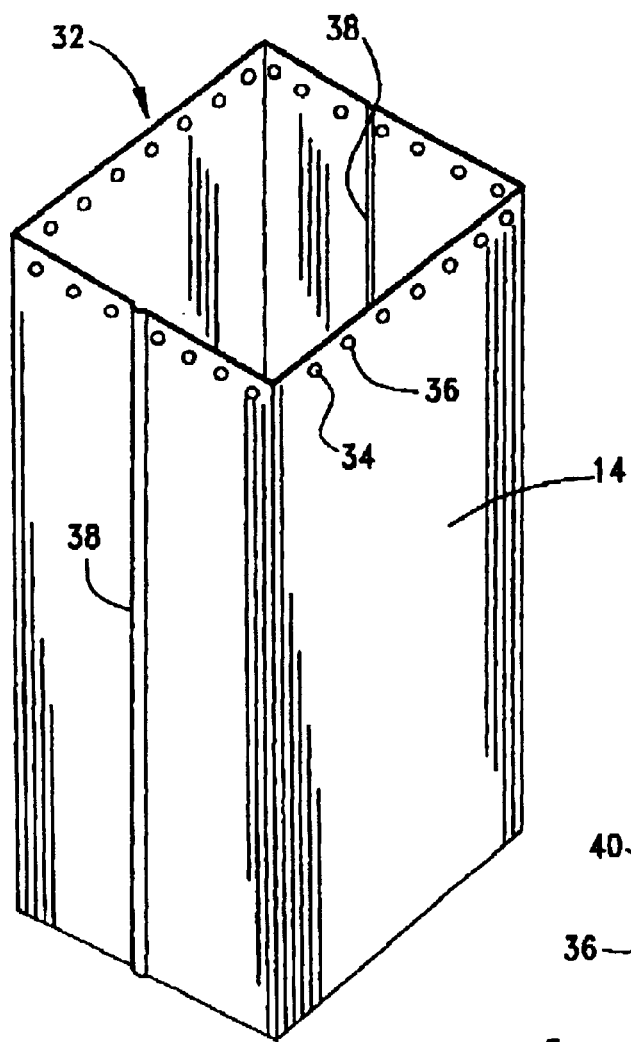
FIG. 3 is a diagrammatic perspective view of a curtain that surrounds one or more treatment cells in the apparatus of FIG. 1.

FIG. 3 illustrates in perspective view one of the curtains 14. It forms a tube-like casing, preferably made of flexible plastic sheeting, for example polyvinylchloride, polypropylene, etc. Due to the flexibility and deformability of the sheeting, the tube-like casing can have any required cross-sectional shape. As shown, it has a square cross-section 32; however, the cross-section may be rectangular, elliptical, circular, etc. In this way, the curtain 14 can be adapted to closely surround and define any shaped block of biomedia, whether solid biomedia, suspended strips, or looped cord. Around the top of the curtain is a series of small holes 34 reinforced by metal (preferably stainless steel) grommets 36. These holes are hooked over pegs extending from the hood (shown in FIGS. 4 and 5); this serves as an aid when mounting the curtain 14 around the hood 12, and it also provides physical support for the curtain 14 once mounted. Extending the full vertical length of the curtain 14 is at least one releasable fastener 38 closing an opening or slit in the curtain. Preferably, there are two, three, four or more such releasable fasteners 38, two being shown. These fasteners may comprise a standard type releasable zipper, preferably of plastic material, as used with outer coats such as Parkas, or may comprise any other type of releasable connection suitable around wastewater. Preferably, this fastener comprises inter-engaging looped and hook strips as sold under the trademark VELCRO. One function of the releasable fastener(s) is to facilitate assembly and mounting of the curtain 14 around the biomedia; this enables the biomedia to be assembled in place and then the curtain hung around the biomedia. Another function is to provide ready access to the biomedia, particularly for inspecting the condition of the biomedia in use, and for repairing or replacing the biomedia. Although the releasable fastener 38 preferably runs the full length of the curtain, one or more of these fasteners may extend only for a portion of the length of the curtain 14.

Figure 4:
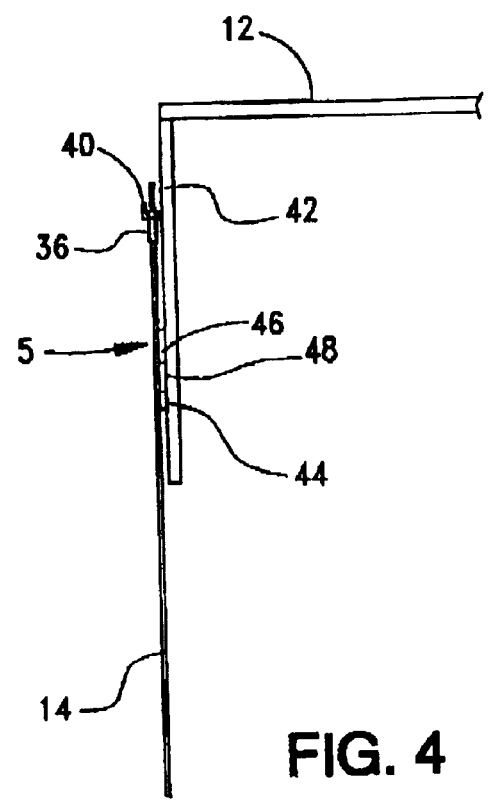
FIG. 4 is a partial vertical section illustrating the connection of the top of the curtain of FIG. 3 to a hood part of the apparatus of FIG. 1.

FIG. 4 shows the attachment of the top of the curtain 14 to the hood 12. One of the grommets 36 at the top curtain edge is engaged over an L-shaped peg or hook 40 mounted on the outside of the hood's downwardly extending sidewall 42. Below the peg 40 are two spaced-apart releasable hook and looped connections 44, 46 (i.e. two pairs of VELCRO connections). These connections extend all the way around the hood 12, and sealingly reinforce attachment of the top of the curtain 14 to the hood. Mounted on the hood between the two releasable connections 44, 46, is a sealing strip 48 of rubber or other gasket material, which also extends all around the hood 12. This sealing strip 48 is resiliently compressible, and presses against the inside of the curtain to ensure both a watertight and an airtight joint between the curtain 14 and the hood 12.

FIG. 5 further illustrates the sealed connection of the upper portion of the curtain 14 to the hood 12. As can be seen, there is a series of L-shape pegs 40 spaced apart around the hood. The vertically spaced-apart VELCRO strip connections 44, 46 can be seen above and below the continuous horizontal sealing strip 48; however, these strip connections and sealing strip are covered and concealed by the curtain 14, but are shown through the curtain in FIG. 5 for the purpose of illustration.

FIG. 6 illustrates the base receptacle 16 with a transparent sidewall 50, so as to show the bottom of the curtain 14 extending down inside the base receptacle.

FIG. 7 is a fragmentary section illustrating the sealing of the bottom of the curtain 14 to the inside of the base receptacle 16. FIG. 8 is a plan view of the top of the base receptacle showing a flange 52 around the outside of the base receptacle 16. FIG. 7 is a section on the line 7—7 of FIG. 8 showing the outside flange 52 formed by two right angle steel bars 54, 56 bolted together at 57. The lower bar 56 is welded to an outside upper lip 58 of the base receptacle 16, and the upper bar 54 is bolted to a flat bar 60 on the inside of the curtain 14, the curtain being sealingly clamped therebetween. In this way, a both water and air tight joint 62 is formed between the bottom of the curtain and the inside of the base receptacle. Adhesive may be used between all mating surfaces and, in addition, a gasket may be sandwiched between the two right angle bars 54, 56 to further ensure the tightness of this joint.

FIG. 9 illustrates a way to make each releasable vertical connection 38 water tight and substantially air tight. At each connection 38, the adjacent edges of the curtain 14 have right angle flanges 64, 66. The facing sides of these flanges 64, 66 each carry a complementary strip 68 of VELCRO or the like, these flanges and strips extending the full vertical length of each curtain edge. On the inside of one curtain edge is welded at 69 a vertical sealing strip 70 of plastic material, e.g. PVC, this strip overlapping the other vertical curtain edge in a sliding and sealing relationship. When the two right angle flanges 64, 66 are physically brought together, the complimentary VELCRO strips 68 sealingly and securely engage, and the flap formed by the internal sealing strip 70 slides over and against the inner surface of the adjacent curtain portion 14 to seal the vertical releasable connection 38.

To assemble the curtain 14 around the biomedia 18, the curtain is first supported by placing grommets 36 over hooks 40, next the pair of VELCRO strips 46 are pushed together, then the pair of VELCRO strips 44 are connected so squeezing the gasket 48. The bottom of the curtain is next connected and sealed to the base receptacle 16. Finally, the releasable connection 38 is "zippered up" by pressing its VELCRO strips 68 together.

Figure 10:
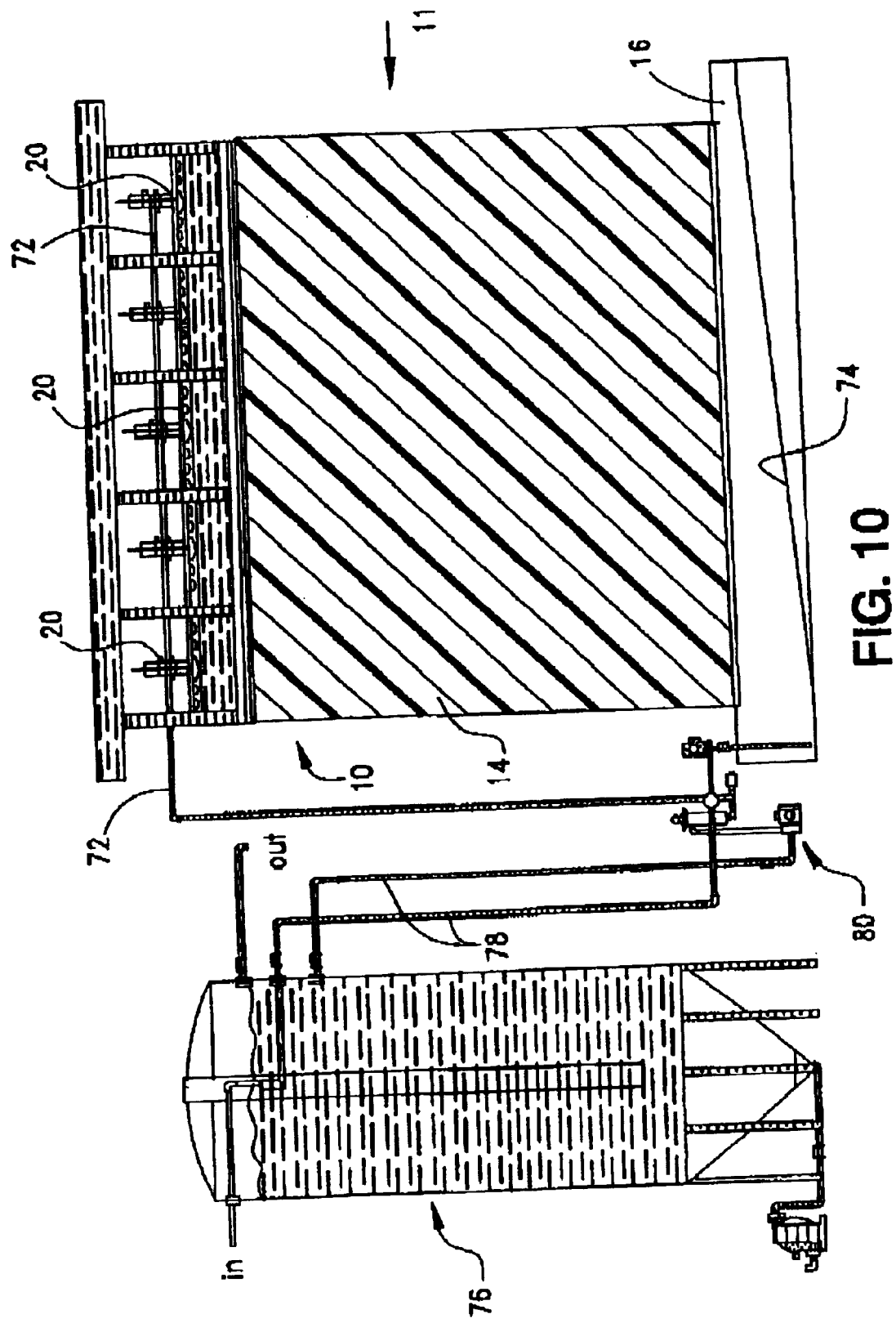
FIG. 10 is a schematic elevational view, partly in section, of another version of the apparatus of FIG. 1.

FIG. 10 illustrates in side view a variant of the apparatus of FIG. 1, and shows an elongate treatment cell 10 surrounded by a curtain 14. At the top of this cell 10 are five wastewater discharge units 20 fed by a common supply pipe 72. An elongate base receptacle 16, with a downwardly inclined floor 74, communicates with an external free-standing recirculation tank 76, and the units 20, via pipes 78 and a pump system 80, which effects recirculation of the wastewater through the cell 10.

Figure 11:
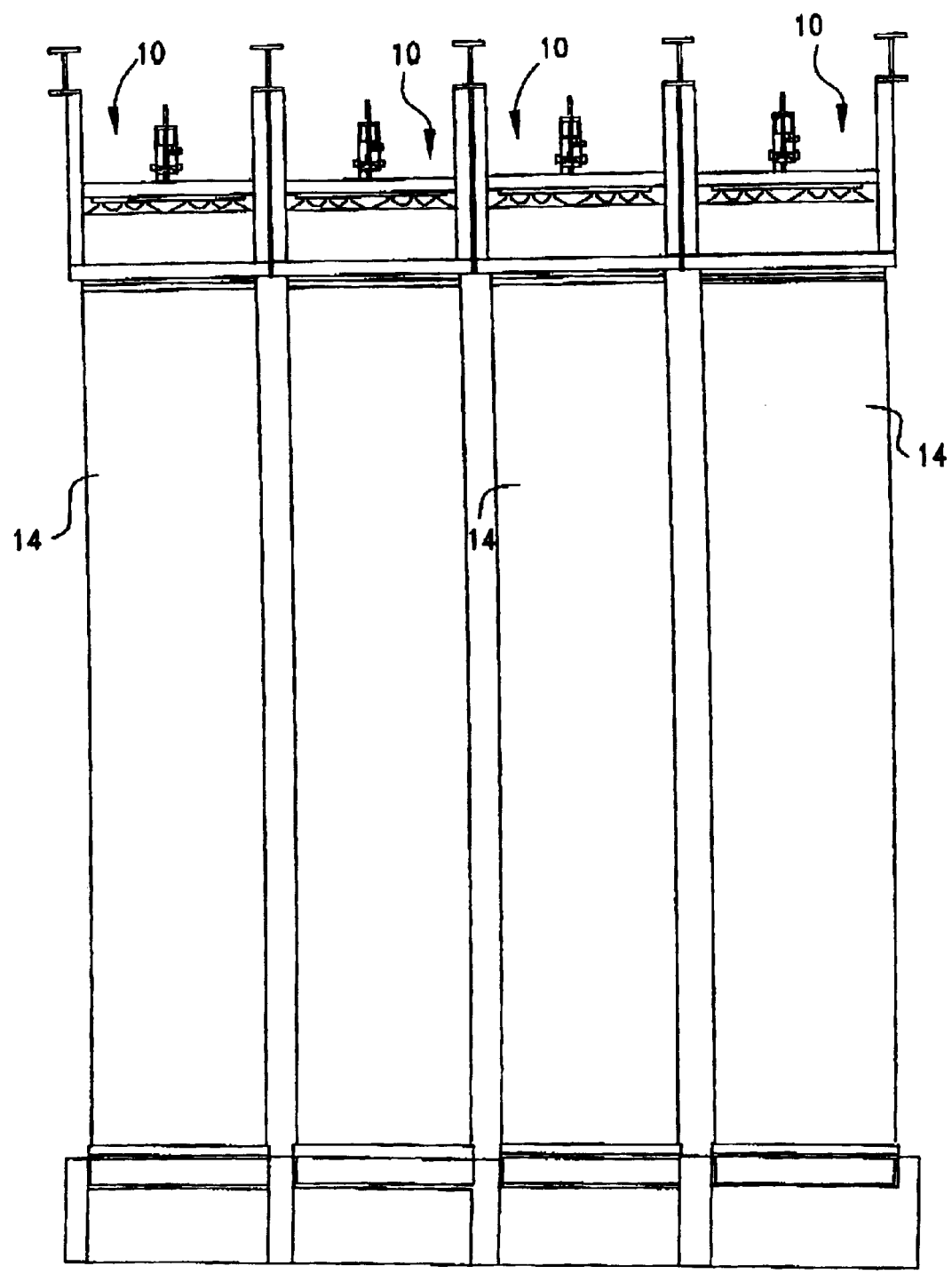
FIG. 11 is a schematic elevational view in the direction of the arrow 11 in FIG. 10.
Figure 13:
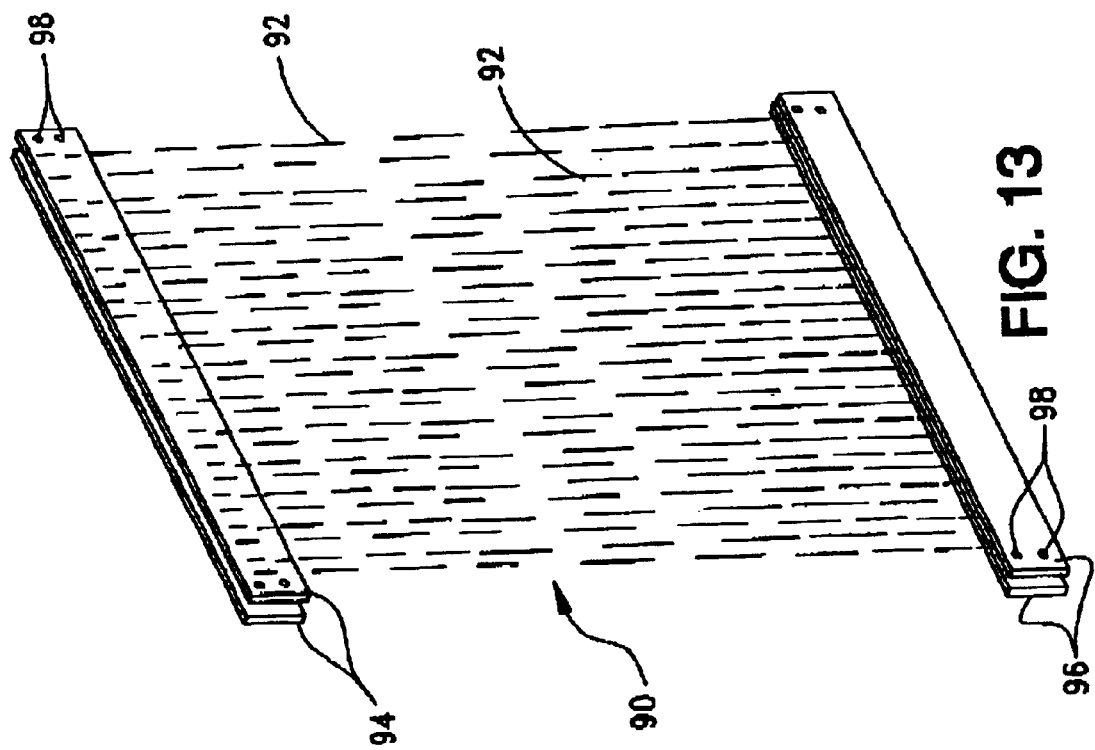
FIG. 13 is a diagrammatic perspective view of a biomedia hanger frame used according to the invention in the apparatuses of FIG. 1 and FIG. 10.
Figure 12:
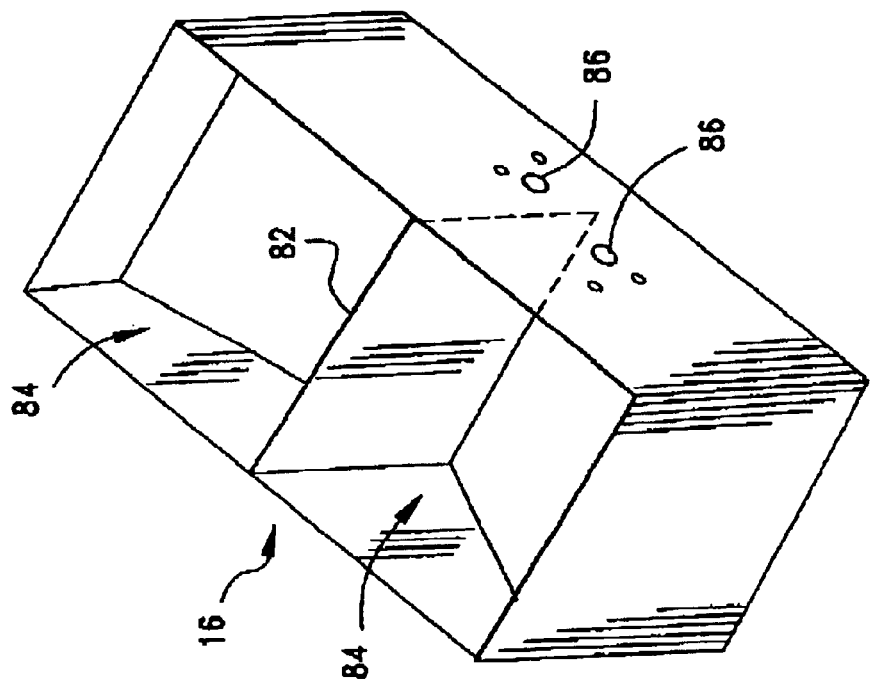
FIG. 12 is a diagrammatic perspective view of a base container partitioned for use with two cells to be surrounded by a common curtain.
Figure 14:
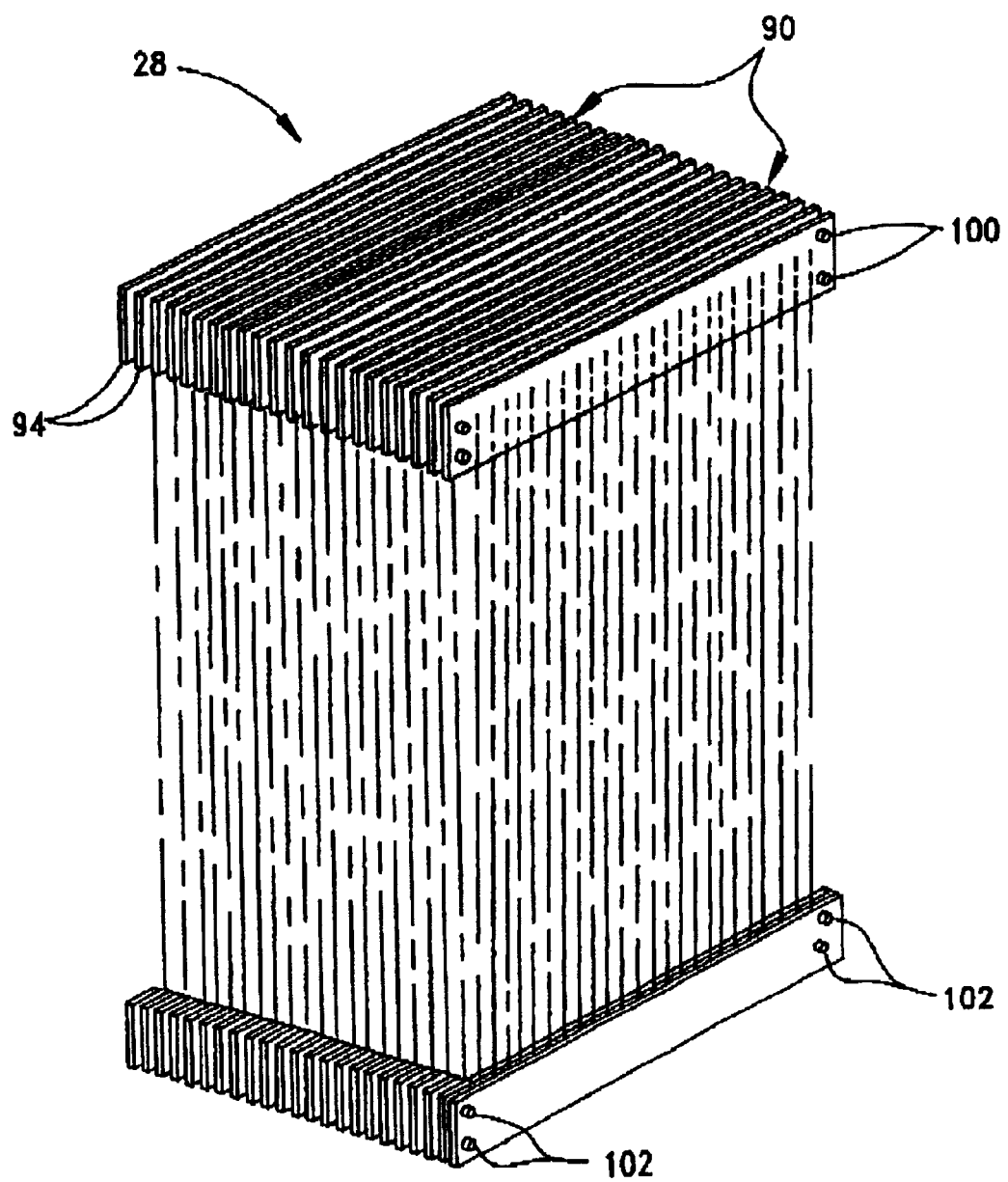
FIG. 14 is a diagrammatic simplified perspective view of a biomedia grate, according to the invention, made up of a plurality of the hanger frames of FIG. 13.
Figure 15:
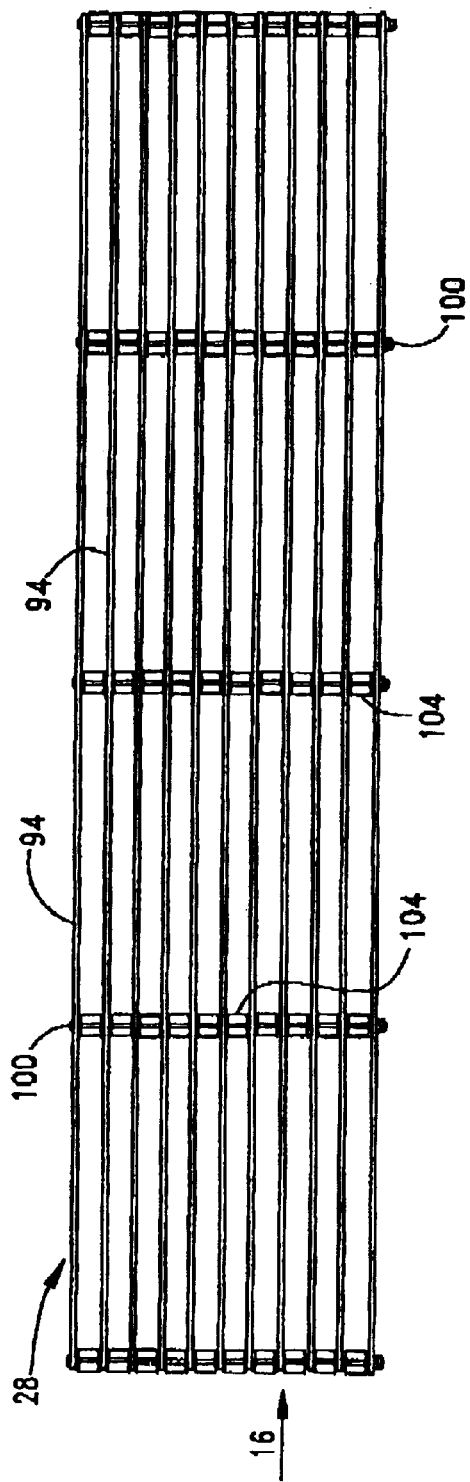
FIG. 15 is a plan view of the biomedia grate of FIG. 14.
Figure 16:
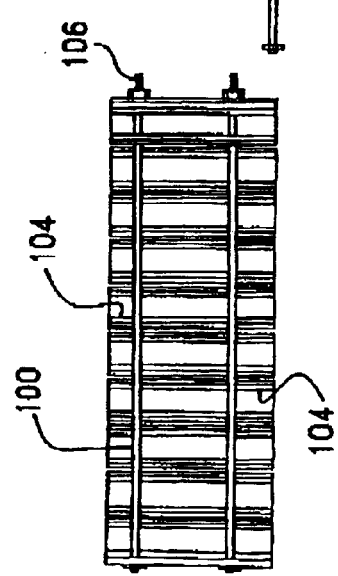
FIG. 16 is an end view of the upper structure of the biomedia grate in the direction of the arrow 16 in FIG. 15.
Figure 17:
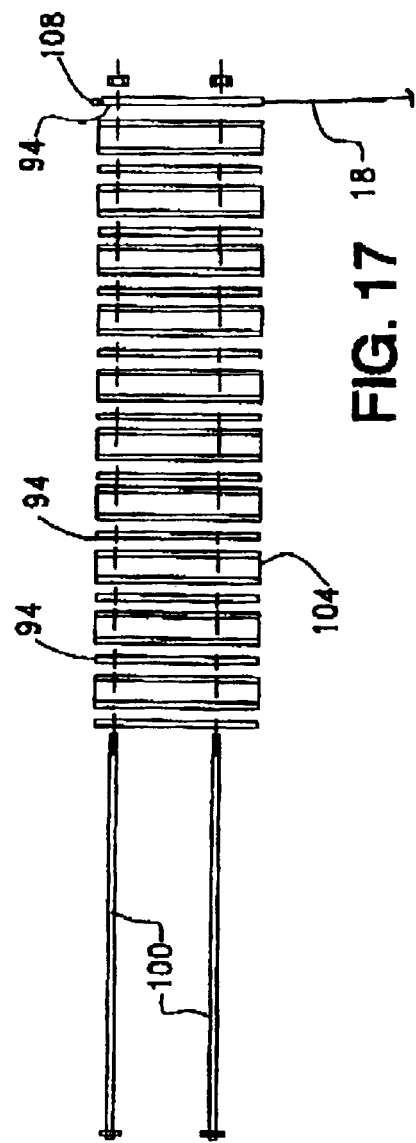
FIG. 17 is an exploded view of FIG. 16 additionally showing a portion of a strand of biomedia.
Figure 20:
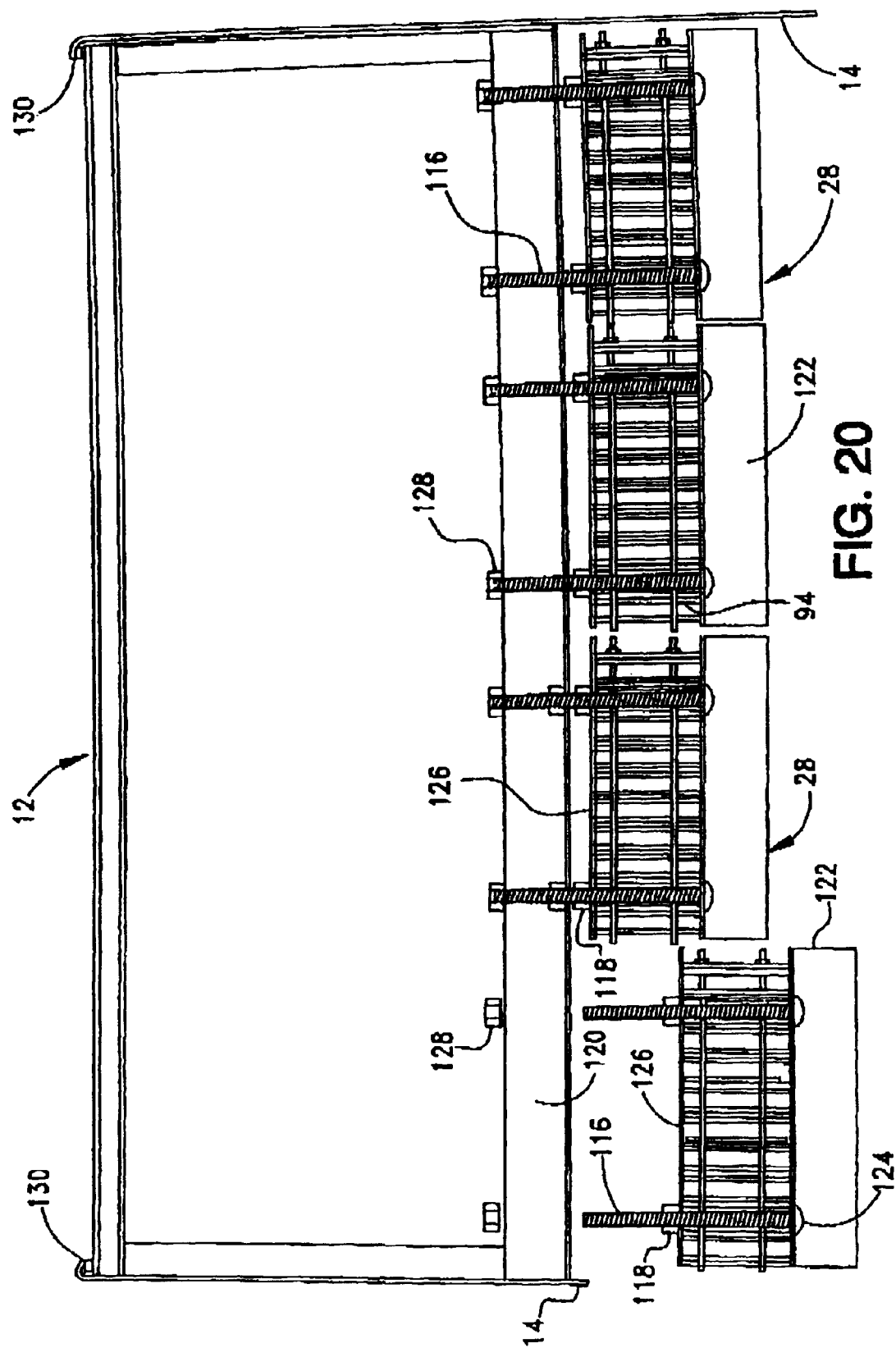
FIG. 20 is simplified vertical section of an upper part of the apparatus of FIG. 1 modified and showing the suspension of the upper ends of four biomedia grates, the left most one in partially exploded view.

FIG. 11 is an end view of the apparatus of FIG. 10, and shows four similar treatment cells 10 side by side. Each of these cells 10, and the biomedia therein, is surrounded and contained by a separate curtain 14. By viewing FIG. 11 in conjunction with FIG. 10, it will be realized that each cell 10 has an elongated rectangular horizontal cross-section.

When the horizontal cross-section of a cell is circular, a rotating spray arm, such as shown and described in previously referenced U.S. Pat. No. 6,241,889, would be satisfactory. However, with non-circular horizontal cross-sections, for instance square, oval, and rectangular cross-sections, a circular spray pattern may leave corner and/or end sections starved of sprayed wastewater. To overcome this, stationary spray nozzles may additionally be placed in the corners, or any other area missed by the circular spray pattern. These stationary nozzles preferably should be given a pulsing action to provide the sprayed biomedia with an opportunity to receive alternately wastewater and air. Alternately, an oscillating spray system could be employed, preferably oscillating about a horizontal axis extending along the longer dimension of the cross-section.

FIG. 12 illustrates a base receptacle 16 for use with two treatment cells contained in a common surrounding curtain 14. A partition 82 in the base receptacle 16 divides it into two separate drip trays 84, each with its own set of outlet ports 86. Each cell would be of square cross-section, whereas the single curtain wall would be of elongate rectangular cross-section.

The above illustrates how the flexible curtain can be used to accommodate a variety of different shapes and arrangements. It does so in a way that is easy and inexpensive to install, relatively inexpensive to manufacture, facilitates inspection of and access to the biomedia, and offers flexibility for different installation configurations. Further, these curtains are virtually maintenance free.

FIG. 13 illustrates a frame or hanger 90 of looped cord biomedia. The hanger frame 90 has a plurality of discrete lengths 92 of looped cord biomedia extending between upper and lower pairs 94, 96 of hanger bars. The ends of the looped cord 92 are clamped between the respective pairs of bars. The pairs of bars are secured together by gluing, although this could be done by spot welding, the bars preferably being made of plastic material, for example ABS. Each end of each pair of bars has a pair of vertically spaced apart holes 98 for assembling a plurality of hangers together. When the pairs 94, 96 of bars are stretched apart, the lengths 92 of looped cord are spaced apart parallel to each other. The ends of the lengths of looped cord may be cut off flush with the adjacent pair of clamping bars, or may extend just beyond the bars. In the latter case, these extending ends may be heat-treated to cause them to fuse and form enlarged ends to more securely retain the ends from pulling through between the pair of clamping bars.

These hangers are preferably manufactured as a series of links connected together and rolled up into a somewhat cylindrical roll. This is done by forming a warp of strands of looped cord biomedia and clamping a pair of hanger bars across this warp. The warp is then advanced the desired length for the hanger, and another pair of hanger bars clamped across the warp. Thereafter, the warp is advanced a short distance (e.g. 1 to 4 inches) and another pair of hanger bars (to form the beginning of the next hanger) clamped across the warp. This process continues with the hangers being reeled onto a spool as further hangers are formed. Individual hangers can be then cut from the spool as required. If the cutting is performed by a hot-air knife, the cut ends of the looped cord biomedia fuse as mentioned above.

The looped cord biomedia is preferably made from knitted polyester or PVDC yarns. If the knitted structure enables the loops to be orientated in one axial direction, then in the biomedia grate, all such loops should be orientated in the same direction. This is enabled by having discrete cut lengths of biomedia formed from a warp. When assembled in a trickle tower, all such loops would be orientated upwards.

FIG. 14 shows a plurality of hanger frames 90 connected together to form a grate 28. The upper pairs of hanger clamping bars 94 are rigidly bolted together by a pair of bolts 100 at each end through the holes previously mentioned. The lower pairs of hanger clamping bars 96 are similarly rigidly bolted together by bolts 102. Spacers keep the pairs of bars correctly spaced apart.

FIG. 15 shows in plan view the top of the grate 28, although the pairs 94 of hanger bars are relatively longer than in FIG. 14. Eleven pairs of hanger bars are equally space apart by spacers 104 cut from square aluminum tubing. With this longer grate 28, five pairs 100 of equally spaced-apart bolts pass through the bars and the spacers. In this way, the upper pairs 94 of bars are rigidly secured together; the lower pairs of bars of this grate are similarly rigidly secured together.

FIG. 16 is an end view of the upper hanger bars of the grate in the direction of the arrow 16 in FIG. 15 (the lower hanger bars would look the same). The connecting and securing bolts 100 are tightened by their nuts 106 at the right end in FIG. 16. The hollow spacer tubes 104 extend vertically between the pairs of clamping bars for the full height thereof. FIG. 17 is an exploded view of FIG. 16, but also showing a strand 18 of looped cord biomedia 18 clamped between the right outermost pair of clamping bars and extending downwardly therefrom; the upper cut end 108 of the strand 18 can be seen extending slightly above the hanger bars. Although the strands of biomedia are clamped between the pairs of clamping bars before these are assembled into a grate, the subsequent tightening of the grate bolts 100 further aids the securing of the biomedia ends. This improves the integrity of the grate 28, and enables the biomedia strands to be able to carry heavier weights of biomass, during operation when purifying wastewater, without the biomass loaded strands tending to pull through the upper clamping bars.

FIG. 18 shows an elevational view of the grate of FIG. 15 with the beginning of the strands of biomedia 18 extending down from the upper bars 94. A modification is also shown in the form of reinforcing anchor strips 110 between the nuts 106 and the outer plastic hanger bar.

FIG. 19 is a view similar to the bottom portion of FIG. 2, but showing the lower anchoring and tensioning bolts 29 for the multiple grates 28 passing through the bottom 112 of the tank 16. Also, this base tank 16 is of double width to function as a common tank for two side-by-side treatment cells, each cell having four grates 28. When the through bolts 29 are tensioned by adjusting their nuts 114 underneath the raised bottom 112 of the tank, the lengths of looped cord biomedia (or any other biomedia strands employed) are tensioned and kept in spaced-apart parallel vertical alignment. The bolts 29 slidingly pass through tubes extending through and sealed to the bottom 112 of the base tank 16, these tubes extending upwardly to above the level of the wastewater in the base tank 16, as shown. This enables the lower ends of the biomedia grates to move downwardly slightly, should the biomedia stretch under the weight of the biomass forming on it during processing of the wastewater.

FIG. 20 shows in greater detail the mounting of the upper ends of the grates 28 to the hood 12 at the top of each cell. Round-headed suspension bolts 116, extending upwardly between adjacent pairs 94 of hanger bars, are locked in place by clamping nuts 118, and then pass upwardly through a cross beam 120 attached to the hood structure 12. Individual lengths of angle bars 122 are disposed under the upper pairs 94 of clamping bars between the round bolt heads 124 and the lower edges of the clamping bars. Individual lengths of flat stock 126 are disposed between the upper edges of the clamping bars and the clamping nuts 118. By adjusting tensioning nuts 128 of the suspension bolts 116, the elevation of the grates 28, and also the tension of the biomedia strands, can be adjusted. The leftmost grate is shown just before mounting to the hood. Another way of mounting the upper end of the curtain 14 on the hood is shown. The curtain 14 extends the full height of the hood 12, with the upper edge 130 of the curtain being hooked-shaped and hooked over the top of the hood. This hooked upper curtain edge 130 slidingly engages a rail running around the top of the hood.

It will be appreciated, that not only does the curtain arrangement enable flexibility and economy in designing and building wastewater trickle towers, but the biomedia grate of the present invention adds further flexibility and economy. The collapsible version of the grates can readily be collapsed and packed in a shipping box for shipping and storage. When needed for service, they are simply lifted out of the box and their upper ends readily secured to the hoods; thereafter, the lower ends can readily be installed in the base receptacles. Any needed separation of the biomedia strands can easily be accomplished through the openable accesses in the curtains. Thereafter, the lengths of biomedia strands can readily be correctly tensioned.

Figure 21:
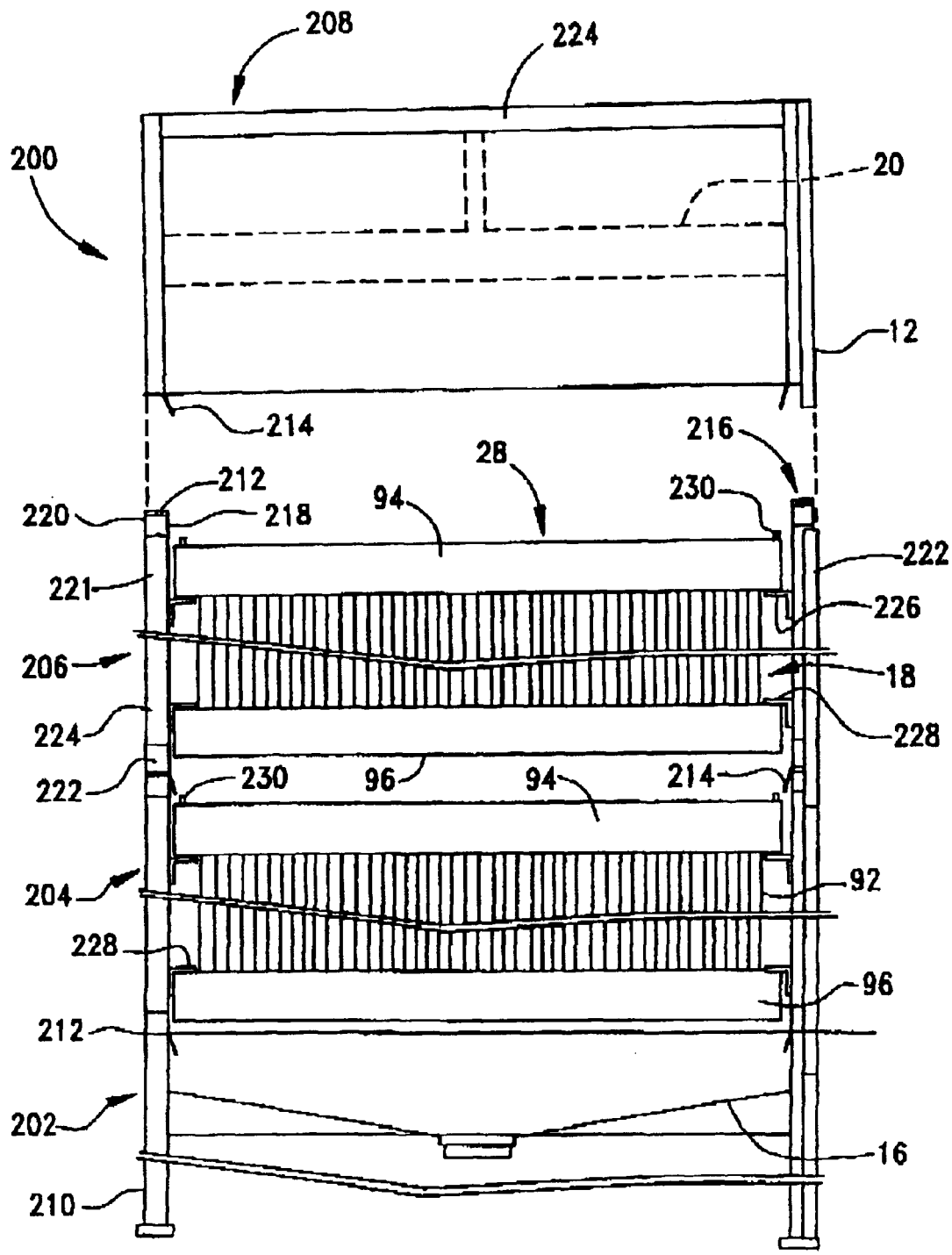
FIG. 21 is a diagrammatic vertical section of another embodiment of the invention and illustrating two vertically stacked, self-supporting biomedia filter units.
Figure 22:
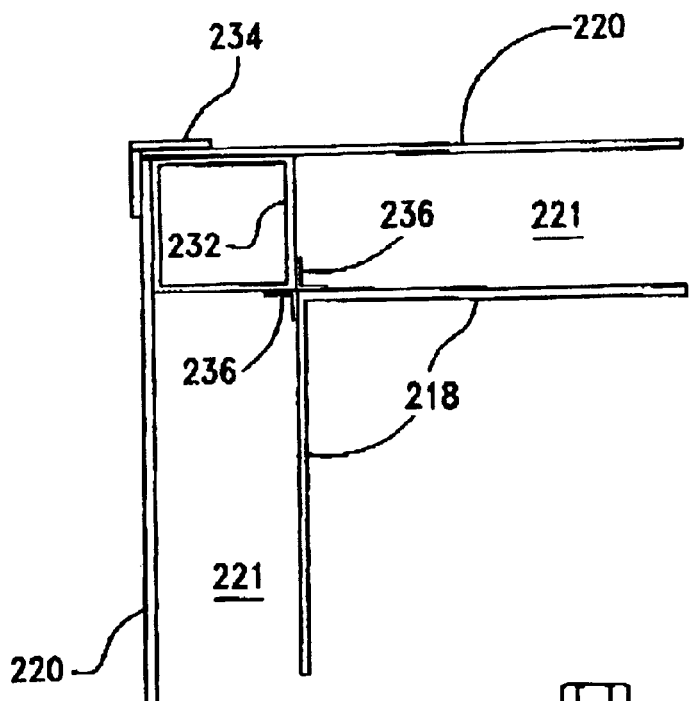
FIG. 22 is a horizontal section of a corner detail of the filter units of FIG. 21.
Figure 23:
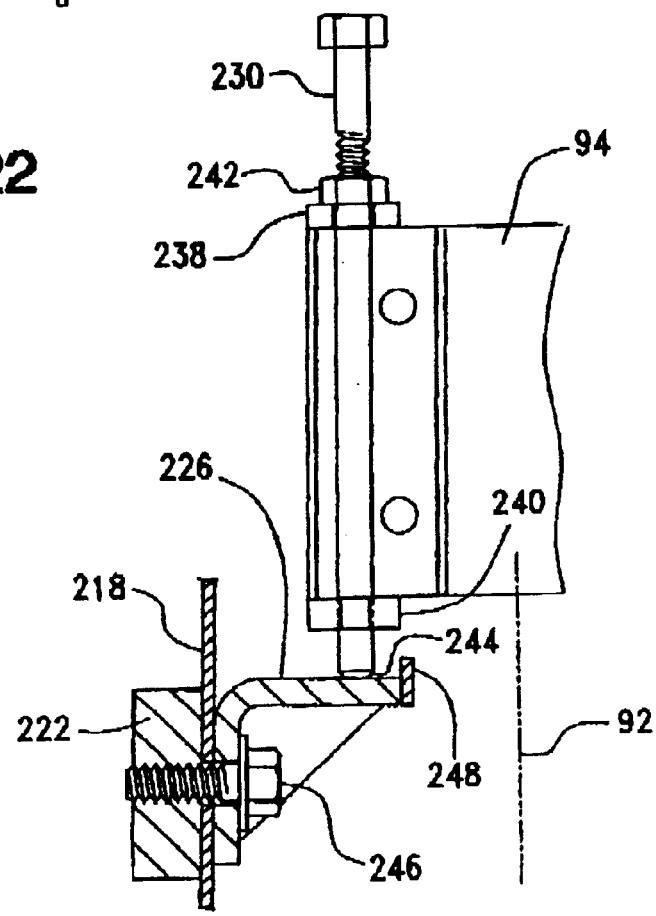
FIG. 23 is a vertical view, partly in section, of a biomedia strand tensioning arrangement employed in the filter units of FIG. 21.

FIGS. 21 to 23 illustrate another embodiment of the invention involving stackable, self-supporting filter units, which in cooperation with other stackable units form a self-supporting trickle tower.

FIG. 21 shows diagramatically in vertical section the self-supporting trickle tower 200 (reduced in height at three locations indicated by double transverse lines). This trickle tower comprises four self-contained, interengaging sections stacked one upon the other, these sections being a base section 202, two identical filter unit sections 204 and 206, and a top section 208. The base section 202 contains and supports the base receptacle 16 for catching the wastewater falling from above. Legs 210 of the base section support the trickle tower 200 on an appropriate foundation, e.g. a concrete slab. These legs may be sufficiently long to accommodate a recirculation tank below, or as, the base receptacle 16. Each of the filter units 204 and 206 contains and supports a biomedia grate 28 as previously described with reference to FIGS. 13 to 17. The top section 208 (shown just before being engaged downwardly onto the upper filter unit section) contains and supports a wastewater discharge system 20, for example as previously described with reference to FIGS. 1 and 10. This top section also forms the hood 12 closing the top of the trickle tower 200. Structural elements of the sections interengage as the sections are stacked upon each other, and gaskets 212 disposed between adjacent sections effect an airtight seal so that the sections 204, 206, and 208, together with the base receptacle 16, form an airtight compartment. The base section may be left open or may be enclosed. Each of the sections 208, 206, 204 has at its lower edge a downwardly and inwardly directed flange 214 to direct falling wastewater inwardly of the horizontal joint with the section below.

Each filter unit 204, 206 has an outer structural casing 216 formed by inner and outer tubes 218, 220, preferably sheet metal or plastic skins, supported and rendered rigid by interconnected structural elements 222 such as posts, beams, angle bars, struts, etc. The outer tube may be of weatherproof material, and the inner tube of material resistant to wastewater. The space 221 between the inner and outer tubes is preferably filled with thermal insulation 224, for example insulation sheeting as used in refrigerators and self-cleaning ovens. Various pipes and wiring of the trickle tower may also feed through the space 221. The top section 208 is similarly constructed. Each filter unit 204, 206 has internal upper brackets 226 and lower brackets 228, which may be individual brackets at each corner of the casing 216, or may be formed by bars, e.g. angle bars, extending along opposite sides of the inside of the casing. The upper brackets 226 extend inwardly sufficiently to support the upper hanger bars 94. The outer ends of the bars 94 extend over the upper brackets, and adjustable bolts 230 screw through the upper frame of the grate 28 and rest on the upper brackets 226 to support the grate 28. The outer ends of the lower bars 96 extend under the lower brackets 228; when the bolts 230 are appropriately adjusted, the lower bars 96 are drawn upwardly against the lower brackets 228 and the strands 92 of biomedia 18 suitably tensioned. In use, should the weight of the biogrowth forming on the biomedia 18 cause the strands 92 to stretch, then the lower hanger bars 96 are free to move downwardly away from the lower brackets 228, with the strands 92 still under tension, minimizing the risk of adjacent strands 92 swaying into contact with each other. Guides may cooperate with the lower hanger bars 96 to guide this downward movement.

FIG. 22 shows in horizontal section a corner portion of either filter unit 204, 206. A vertical corner post 232 forms a main structural element and sheets forming the outer tube 220 are secured to outer surfaces of the post 232. An angle bar 234 helps secure the outer tube 220 to the corner post 232. This angle bar 234 also functions to engage a corresponding angle bar on the abutting unit when the units are interengaged, with the ends of these angle bars overlapping the ends of adjacent corner posts to which they are then secured. Sheeting of the inner tube 218 is attached to the corner post 232 by a pair of smaller angle bars 236. Other structural elements (not shown) interconnect the corner posts, and further structural elements extend between upper and lower end frames of the casing to create sufficient structure in the casing 16 to render it rigid, self-supporting and sufficiently strong to support other units stacked upon it (including the weight of the biomass which forms on the strands of biomedia).

FIG. 23 shows one of the adjustable bolts 230 passing through upper hanger bars 94 of a grate and resting on one of the upper brackets 226. The upper bars 94 of the grate are sandwiched on each side between upper and lower plates 238, 240. The bolt 230 passes freely through the lower plate 240, but is a screw fit through the upper plate 238. After the bolt has been adjusted, it is locked in position by a locking nut 242. The lower end 244 of the bolt 230 is tapered, and this taper 244 may engage in a location dimple in the bracket 226. A lip 248 on the bracket 226, in cooperation with a corresponding lip on the bracket at the opposite side, ensures the adjustable bolts 230 on each side of the grate are retained on the brackets 226. Each bracket 226, which is preferably in the form of a bearing rail running the full depth of the grate, is secured in position by bolts 246 passing through the inner tube 218 and threadedly engaging in a structural element 222 between the inner and outer tubes 218, 220. Four such adjusting and supporting bolts 230 are located adjacent the four upper corners of the grate. Although not preferred, the bolts 230 could be located at the midpoints of the four upper edges of the grate, or at other positions.

The bolts 230 with the brackets 226 comprise tensioning means for adjustably tensioning the biomedia strands 92 by influencing the upper and lower hanger bars apart. In another form of the tensioning means, the upper hanger bars 94 may rest adjustably or non-adjustably on the brackets 226, and adjustable bolts or other members may be associated with the lower hanger bars 96 and adjustably engage the lower brackets 228. Alternatively, with or without upper adjusting bolts 230, the tensioning means may comprise arrangements such as shown in and described in relation to FIGS. 2 and 19, or may comprise appropriately weighting the lower hanger bars 96 of the grate 28.

The trickle tower 200 may stand alone as a single cell tower, or may form a cell in a multi-cell trickle tower system. When the casing units contain thermal insulation, and the outer wall is weatherproof, the trickle tower 200 does not need to be housed in a protective building.

It will be appreciated, that the construction of the grates and the manner of readily adjusting the tension of the biomedia strands, reduces any tendency of the strands to sway towards each other in use, so mitigating biomass bridging between strands. This risk is even further reduced by the feature of enabling the lower hanger bars to be downwardly movable.

It will also be realized, that the sealing of the curtain at the top and bottom of the cells enables the air or other gas content in the cells to be more accurately controlled, thereby improving operating conditions. The same applies to the sealed arrangement obtained by sealingly stacking the wastewater discharge unit, the self-supporting filter units, and the base receptacle unit.

The above described embodiments, of course, are not to be construed as limiting the breadth of the present invention. Modifications, and other alternative constructions, will be apparent which are within the spirit and scope of the invention as defined in the appended claims.

What is claimed is:

1. A biomedia filter unit for incorporation in a trickle tower wastewater treatment apparatus, said filter unit comprising:
    a grate comprising a plurality of hanger frames, each hanger frame comprising a row of spaced-apart biomedia strands;
    each frame further comprising a pair of mutually connected upper bars and a pair of mutually connected lower bars, upper ends of the strands of a respective row being clamped between the upper bars and lower ends of these strands being clamped between the lower bars; and
    the rows of biomedia strands being spaced apart with the upper bars of the grate being connected together and the lower bars of the grate being connected together;
    an outer structural casing with the upper hanger bars supported inside the casing to support the grate, and the lower hanger bars held downwardly inside the casing away from the upper hanger bars.

2. The biomedia filter unit of claim 1, further comprising tensioning means, operative between the grate and the casing, for adjustably tensioning the strands.

3. The biomedia filter unit of claim 1, wherein said casing comprises two spaced apart tubes with thermal insulation therebetween.

4. The biomedia filter unit of claim 1, further comprising an outer self-supporting casing, said casing having at least one upper internal bracket and at least one lower internal bracket, an upper end of said grate being supported by the upper bracket, and a lower end of the grate being restrained against upward movement by the lower bracket.

5. The biomedia filter unit of claim 4, wherein said casing has a lower, inwardly directed flange below said lower bracket to divert wastewater inwardly of said casing.

6. The wastewater trickle tower apparatus of claim 1, wherein at least a portion of the casing, is constructed of a weatherproofing material.

7. The apparatus of claim 1, further comprising an adjustable member operative between said upper hanger bar unit and said casing, the adjustable member being adapted to tension the strands.

8. The apparatus of claim 1, wherein said casing comprises inner and outer spaced-apart walls with a cavity therebetween.

9. The apparatus of claim 1, wherein there is a plurality of the biomedia filter units stacked one upon another.

10. A wastewater trickle tower apparatus, comprising:
    a grate comprising a plurality of hanger frames, each hanger frame comprising a row of spaced-apart biomedia strands;
    each frame further comprising a pair of mutually connected upper bars and a pair of mutually connected lower bars, upper ends of the strands of a respective row being clamped between the upper bars and lower ends of these strands being clamped between the lower bars;
    the rows of biomedia strands being spaced apart with the upper bars of the grate being connected together and the lower bars of the grate being connected together; and
    a casing enclosing at least a portion of said grate and comprising a thermal insulation material.

* * * * *